April 27, 1937. J. H. HOTSON 2,078,249
DEVICE FOR WEIGHING OF THE BALANCE TYPE
Filed June 19, 1934
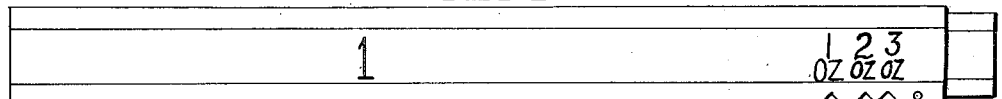
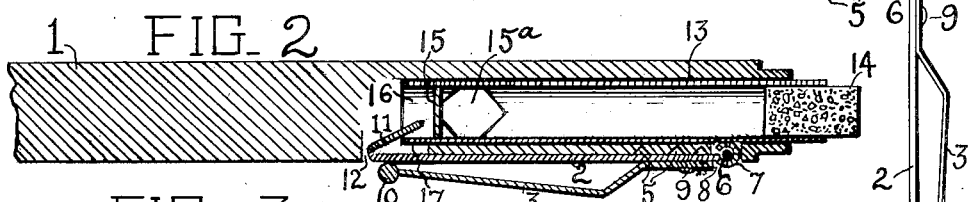
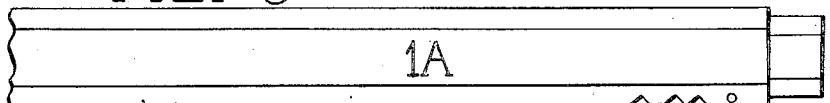
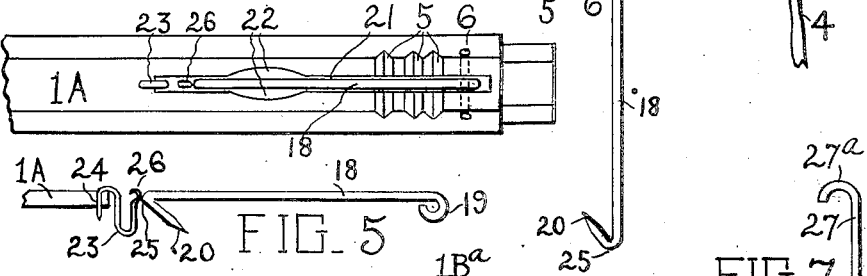
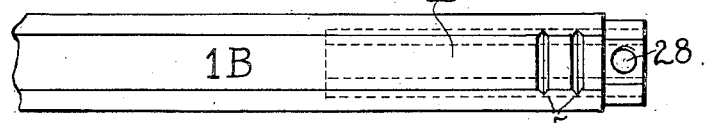
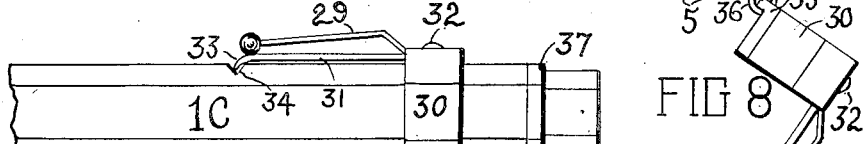
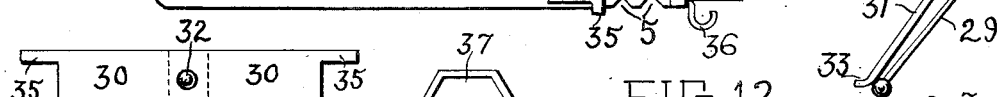
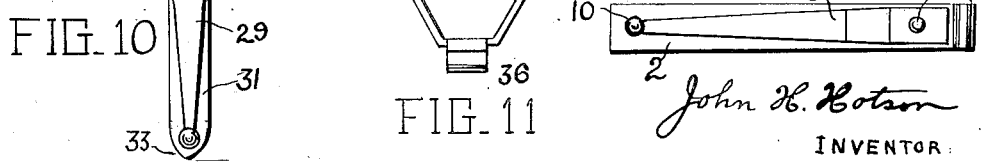
John H. Hotson
INVENTOR Patented Apr. 27, 1937

2,078,249

UNITED STATES PATENT OFFICE 2,078,249

DEVICE FOR WEIGHING OF THE BALANCE TYPE

John H. Hotson, Woodside, N. Y.

Application June 19, 1934, Serial No. 731,255

9 Claims. (Cl. 265—32)

The object of my invention is to provide a simple and efficient means by which a number of common articles, such as pencils, pens, measuring rules, walking sticks, screw drivers, and other similarly shaped or elongated articles, may be readily converted into devices for weighing objects, and back again into their original functional form, in which latter state the extra means are so arranged in and against the body of the article itself as not to interfere with the ordinary use of the article.

To mention a few of the articles to which my invention may be applied, I will enumerate, besides those mentioned above, the following: blackboard pointers, fishing rods, police nightsticks, hammers, rakes, toy shovels, flashlights, elongated tool holders, elongated tool handles—in short, any elongated article in common use which is readily handled, and in connection with which, or even not related to which, it is desirable to ascertain weights of objects handled or dealt with, when a regular scale is not at hand. For example, the fisherman could, by the use of my invention embodied in his rod, weigh the fish caught, and the teacher could, by the use of my invention attached to his blackboard pointer, test the pupils' judgment of weight, by weighing objects after the pupils have estimated the weight.

The article which I particularly select, in order to illustrate my invention, is a mechanical pencil, and I especially adapt it to the weighing of letters, to ascertain the amount of postage to be attached. The utility of this is at once obvious, in the saving of time and effort in going after a scale when one is not at hand, or going to a store or other place to request the weighing of the letter. The pencil is always at hand when carried on the person. And in connection therewith, I illustrate and claim various details of construction. However, I wish to point out that the essential features of my invention may be equally well applied to any of the other articles I have mentioned or to any article of similar or analogous construction, by simple adaptations easily obvious to anyone skilled in the art after reading this specification and the accompanying drawing, in which Fig. 1 is a side view of the body of a pencil of a type in common use, embodying my invention, with the lead-bearing tip of the pencil and the cap at the top end removed.

Fig. 2 is a sectional side view of pencil, showing the details of the mechanism embodied in Fig. 1, and showing same in folded position.

Fig. 3 is a similar view to Fig. 1, but showing another variation of my invention.

Fig. 4 is another view of the construction shown in Fig. 3, but showing it in folded position.

Fig. 5 is a detail of Figs. 4 and 3.

Fig. 6 is a view of the body of a pencil showing another modification of my invention.

Fig. 7 is a view of the suspensory member adapted to hang from the pencil shown in Fig. 6.

Fig. 8 shows another modification of my invention.

Fig. 9 shows the same with the suspensory member in Fig. 8 in position secured to the barrel of the pencil.

Fig. 10 shows details of the construction of the clip or clasp shown in Figs. 8 and 9.

Fig. 11 shows another detail of Figs. 8 and 9.

Fig. 12 is a top view of the clip or clasp shown in Figs. 1 and 2.

Referring more in detail to the drawing, in which Figs. 1, 2 and 12 illustrate the preferred form of my invention as applied to a mechanical pencil, 1 designates the body of a type of pencil in common use from which the nib or lead-carrying portion is removable by a pull towards the left, which nib is omitted therein, and which body of pencil is hollow in the right hand portion of the barrel as shown in Figs. 1 and 2 (and in fact the barrels shown in the other drawing are designed to be hollow from the right hand end to a point a little to the left of the left end of the clip when in stowed-away position). 2 and 3 together constitute a suspensory member designed to uphold an object to be weighed, in this case preferably a letter, 4, which member is also adapted to clip the pencil to the free edge of a pocket by being pushed astride of the same. When the pencil is held up horizontally, this suspensory member is free to swing loosely in a vertical position suspended from the pencil. Notches 5 are preferably provided, cut into the under side of the pencil when in the horizontal or weighing position, preferably wedge-shaped, so that the fulcrum may seek the center more accurately, and designed to rest on a preferably wedge-shaped or knife-edge shaped object adapted to act as a fulcrum. While I prefer a notch of the form shown, I do not wish to limit myself to any particular means on the elongated member adapting it to be supported on a fulcrum at different points. Alternative means will readily suggest themselves, such as a depression or a loop in the side or top of the elongated member adapted to have upholding means attached to the elongated member adapted to suspend it from above; or such as a stirrup-shaped means adapted to slip loosely over the elongated member and to be moved back and forth on the same, the crosspiece or footpiece at the bottom of the stirrup being adapted to support the elongated member, and the stirrup-like means being suspended from a point above the elongated member. Such and similar means are all variations within the scope and spirit of my invention.

The suspensory member is illustrated more in detail in Figs. 2 and 12. Fig. 2 is a sectional view taken through the middle vertical line of the pencil lengthwise as it stands in Fig. 1. The suspensory member 2—3 is looped at one end 7 over a pivot 6, the end portions of which pivot are securely imbedded in the material 1 (see Fig. 4, where the top view of a similar pivot is shown), and the middle part of which bridges and passes through a depression or gap in the outer surface of 1, where the material has been cut away, as shown at 8 (in a similar manner to the slot 21 in Fig. 4), in order to allow the looped part 7 of 2 to turn free on the said pivot. 2 and 3 are fastened securely together by means of a rivet 9, and when so secured the ball 10 is held against the end portion of 2 by spring tension provided by resiliency of 3, or of 3 and 2. This grip might be varied to the form of an ordinary two-jawed spring clasp or clip such as are in common use for a variety of purposes, such as a tie clasp or paper clasp, adapted to be opened by pressure of the fingers on certain parts to impel the clasp to open in order to grip the object to be weighed, without going beyond the scope of my invention. In other words, in this form of my invention, I do not limit myself to the particular means for clasping the object here shown; nor in fact do I, in the application of my invention to any article, limit myself to any particular means for suspending the object to be weighed. They may be varied within the spirit and scope of my invention. The end 11 may in certain cases be used as a lug or hook upon which to hang an object to be weighed. When the suspensory member 2—3 is folded up against the barrel of the pencil, the section 11 projects in through an opening 12 in the barrel 1. To secure it there, I prefer to insert inside of the right hand end portion of the barrel 1 a tube 13 held therein by friction or tension. This tubular shaped part is open at the right hand end to accommodate an eraser 14, which is adapted to be held therein by friction or tension. The part of the tubular-shaped member adjacent to the eraser is designed to hold reserve leads, and as a bottom for the leads to rest upon, the part 15 is struck out from the rear side of 13 at 15ᵃ and bent forward and to the left to form such bottom at a right angle to the sides of 13. The tube 13 is open at the end 16, and when the tube 13 is pushed into 1, it is adapted to have its open tubular end at 17 engage the section 11 so as to hold 2—3 securely in close and compact relation with 1.

A modification of this adaptation of my invention is shown in Figs. 3, 4 and 5, where the suspensory member 18 is in the form of a piece bent at one end 19 to turn upon the pivot 6 loosely, and at the other end is bent up in a hook form with sharpened point 20, which is adapted to support an envelope by penetrating into the material of the paper. 18 is swung on a pivot 6, similarly as in Fig. 1, and in the closed position rests in a crevice or slot 21 in the material of 1A. There is provided a widened section 22 in said slot, which is cut out in a form so as to adapt the finger or thumb nail to get under 18 to lift it out when desired. 18 may be secured in the crevice by incorporating a slight bend or bowing laterally in the body of 18, so that when forced into the crevice, it will be straightened out against its natural rest form and thus by tension against the sides of the crevice 21 stick therein. Or it may be secured in the crevice 21 by some such means as shown in Fig. 5. A piece of spring wire 23 is bent up into the shape shown, the end 24 thereof being driven tightly into the material of 1A. When in being folded down the shoulder 25 of 18 comes against the part 26, it is snapped past it by finger pressure, and by the spring tension of 23 is held in the position shown from coming out of the crevice 21 except when lifted therefrom by a certain amount of upward pressure. In this application of my invention, I do not of course limit myself to the particular means here shown of holding the suspensory member in folded position in the elongated member, but various means will readily suggest themselves to any one skilled in the art.

Figs. 6 and 7 show another variation of my invention, in which the top portion 27ᵃ of the suspensory member 27 is adapted to hook into the opening 28 in the side of the barrel of the pencil in which are the notches 5, and near the end of the barrel, and when not in use for weighing the suspensory member 27 is adapted to be inserted within the recess 1Bᵃ in the end of the barrel usually kept for reserve leads, shown in dotted lines in Fig. 6, and may be held from coming out by a rubber eraser such as 14 shown in Fig. 2.

Figs. 8, 9, 10 and 11 exhibit another embodiment of my invention. The suspensory member 40 is in the form of a clip or clasp somewhat similar to that shown in Figs. 1 and 2. This clip is composed of two parts, one of which, 29, has wings 30, adapted to clasp around the barrel of the pencil with a tensional grip, and the other part of which, 31, is secured to 29 by means of a rivet 32. 31 has its tip 33 turned down into a recess 34 in the body of the pencil, to hinder longitudinal slipping, and also to get the end of 31 out of the way when the clip or clasp is slipped over the free edge of a pocket. In order to weigh a letter, the clip is slipped off the barrel and suspended at the narrow parts 35 from the lug 36, which is formed by an extension of the material of a metal band 37, which is slipped around the barrel 1C, which latter is preferably recessed so as to allow 37 to lie flush with the surface of the barrel, as shown. The letter to be weighed is squeezed by finger pressure in between the spring jaws formed by 29 and 31.

There are of course numerous modifications which may be made in the details of my construction and the means of attachment and securing of the suspensory member to the main or elongated member, as adapted to articles of the types I have indicated, all within the spirit and scope of my invention, and I do not desire to limit myself to the means here shown, as various other types of means within the scope of my invention will readily occur to any one skilled in the art, as applicable to any article I have referred to or any similar or like article adapted to be used for weighing in the manner set forth herein. For example, the suspensory member may be held in closed or folded position by securing it to a projection on the main member, or vice versa, in a manner readily occurring to a person skilled in the art. I desire broadly to include any and all means embodied in the main member and in the suspensory member adapted to secure the two parts together in a close and compact manner, within the spirit and scope of my invention, when the parts are not employed in weighing, in such a manner as not to interfere with the use to which the article in question is ordinarily adapted.

As a detail of my invention, I desire to claim broadly a two-jawed clip or clasp adapted to clip a pencil or the like to the free edge of a pocket, by being pushed astride of said free edge, with the jaws impinging against each other by spring pressure. Both parts may be provided with resiliency, so that if one member becomes set or loses its resiliency the other may still provide the necessary resiliency. Also, if such a clip were attached to the barrel of a pencil or pen by a rivet, as is commonly done, the accidental loosening of said rivet, as frequently happens in the use of the ordinary pencil or pen clip, would not affect the resiliency of the grip, as is the case with the single-jaw clip in common use, which depends on the barrel of the pencil or pen for the other jaw. My type would require less care in the operation of riveting to the pencil or pen, and therefore is easier to attach. Also, when two jaws are embodied in an attachable and detachable clip, as illustrated in Figs. 8, 9 and 10, the resiliency remains the same, even should the arms of the clip which clasp around the barrel become loosened. With the point of the under jaw turned down into the body of the pencil, the attachable clip gets a grip into the pencil, thus tending to prevent the clip from sliding lengthwise on the pencil, when, in putting the pen into the pocket, the ball point of the clip rides over the edge of the pocket.

In the preferred form of my invention as applied to pencils and the like, as shown in Figs. 1, 2 and 12, the member 2 of the clip or clasp which comes against the barrel of the pencil is sunk into a recess in the barrel, so that its outer surface is flush with the outer surface of the barrel. This member 2 of the clip may, if desired, be made of material similar to the barrel of the pencil, or there may be inserted and fastened between the two parts 2 and 3 of the clip a piece of material of the same appearance as that of the barrel of the pencil and the parts then so adjusted that the outer surface of such piece of material may be flush with the outer surface of the barrel and the part 2 of the clip hidden from view under the same.

In describing my invention as applied to a pencil or pen, and particularly with reference to the features of the pocket clip, I do not of course limit myself to a pencil or pen only, but desire broadly to include any article which may be carried in the pocket with a clip attached, such as a pocket flashlight, corkscrew inserted in a wooden sheath, elongated pocket lighter, small barrel-shaped case containing tools, any special tool capable of being so carried, or in short any article now known or hereafter to be developed adapted to being carried in the pocket with a clip attached designed to grip the free edge of a pocket.

The location of the notches on any particular elongated or beam member may be determined by suspending the respective weight from the suspensory member and balancing the main or beam member on a knife-edged fulcrum and marking the spot with a notch or depression, preferably wedge-shaped, cut into the beam member. The symbols "1 oz.", "2 oz.", and so forth, may be inscribed on the elongated member opposite the respective notches, or "½ lb.", "1 lb.", and so forth, in the case of beams of a heavier character.

The particular form of the fulcrum constitutes no part of my invention, as any suitable object, such as a knife blade, edge of shears, paper weight edge, hair pin, wire, rod, bit of pasteboard, edge of a piece of flat metal, or one of a hundred different objects which are adapted to fit into the notch on the under side of the main member, can serve as the fulcrum. In fact, the finger nail might in some cases be used as a fulcrum.

Having thus described my invention, what I claim as new therein and desire to secure by Letters Patent is as follows:

1. A clip attachable to an elongated article, comprising in itself two jaws spring actuated against each other and adapted to engage between them the free edge of a pocket when the clip is parallel with the body of said article, means adapting said clip to be attached loosely at a point on the body of the article and to swing freely at substantially right angles to said body when same is suspended in a horizontal position, said clip being adapted to having pushed between its jaws an envelope or letter.

2. A balance comprising an elongated member, a suspensory member pivoted to said elongated member at a point between the center of gravity lengthwise of the elongated member when held horizontally and one end of the same, said suspensory member being adapted to swing freely from said elongated member when the latter is held in a substantially horizontal position, said suspensory member having the free end thereof bent at an acute angle to its main body, said bent portion being adapted to enter an opening in the outer wall of said elongated member when desired, and a removable inner receptacle in said elongated member provided with an extension adapted when in position to engage said bent portion of the suspensory member and thereby hold same in folded position.

3. A balance comprising an elongated member having a recess in the outer surface thereof, and a clip having in itself two jaws spring actuated against each other, said clip being adapted to swing loosely from a point on said elongated member when desired, one of said jaws being adapted to lie in said recess when said clip is substantially parallel with the body of said elongated member, and the operative face of said last named jaw being adapted to form a substantially continuous surface with the adjacent portions of said elongated member.

4. A balance adapted to be carried in a pocket, comprising an elongated member, a suspensory member pivotally attached thereto, said suspensory member comprising two portions secured together adjacent said pivotal point, and having their outer ends resiliently bearing against each other, whereby said portions when the balance is placed in the pocket are adapted to engage between them the edge of the pocket, and whereby also an object to be weighed may be suspended from the balance, means on one of said resiliently-bearing portions whereby the suspensory member may be locked in a position parallel to said elongated member, and means whereby said elongated member may be fulcrumed.

5. A balance adapted to be carried in a pocket, comprising an elongated member, a suspensory member swingingly attached thereto, said suspensory member comprising two portions resiliently bearing against each other whereby the balance when placed in the pocket may be secured to the pocket edge and whereby also an object to be weighed may be suspended from the balance, one of said resiliently-bearing portions being provided with a hook adapted when said suspensory member is lying parallel with said elongated member to enter a socket in said elongated member, a removable receptacle adapted to lie within said elongated member and provided with a portion adapted to engage said hook and hold said suspensory member parallel to said elongated member when said receptacle is in place, and means whereby said elongated member may be fulcrumed.

6. A balance comprising an elongated member, a suspensory member pivotally attached thereto, said suspensory member being provided with a hook, a removable receptacle adapted to lie within said elongated member and provided with a portion adapted to engage said hook and hold said suspensory member parallel to said elongated member when said receptacle is in place, and means whereby said elongated member may be fulcrumed.

7. A balance comprising a barrel, a member swingingly secured to said barrel and adapted when permitted to swing freely with relation thereto to support an article to be weighed, an inturned end on said swinging member, and a receptacle longitudinally removable in said barrel and adapted to engage said inturned end and thereby hold said swinging member parallel to said barrel.

8. A balance comprising a barrel having an opening in its outer wall, a clip swingingly secured to said barrel, said swinging clip comprising a member corresponding in form to said opening and provided with an inturned end and a second member spring actuated against said first member, whereby said clip when permitted to swing freely is adapted to support an article to be weighed and when placed in a position parallel to said barrel is adapted to close said opening, and a receptacle longitudinally removable in said barrel and adapted to engage said inturned end and hold said clip in position to close said opening.

9. A balance comprising a barrel having a recess in its outer wall, a clip comprising two jaws spring actuated against each other whereby said clip when permitted to swing freely is adapted to support an article to be weighed, one of said jaws being provided with an inturned end and being also adapted when said clip is substantially parallel with the body of said barrel to lie in said recess so that the operative face of said jaw shall form a substantially continuous surface with the adjacent portions of said barrel, and a receptacle longitudinally removable in said barrel and adapted to engage said inturned end and hold said clip in position to close said recess.

JOHN H. HOTSON.